(12) United States Patent
Lu

(10) Patent No.: US 6,393,510 B1
(45) Date of Patent: May 21, 2002

(54) LOW POWER HIGH-SPEED BUS RECEIVER

(75) Inventor: Jr-Houng Lu, Keelung (TW)

(73) Assignee: Vanguard International Semiconductor Corporation, Hsinchu (TW)

( * ) Notice: Subject to any disclaimer, the term of this patent is extended or adjusted under 35 U.S.C. 154(b) by 0 days.

(21) Appl. No.: 09/400,353

(22) Filed: Sep. 20, 1999

(30) Foreign Application Priority Data

Mar. 18, 1999 (TW) ........................................ 88104222 A

(51) Int. Cl.$^7$ .............................................. G06F 13/00
(52) U.S. Cl. ...................................................... 710/305
(58) Field of Search ........................ 710/305; 330/147; 327/563; 455/130, 334, 341; 326/62, 17, 115; 307/85, 113, 115, 116

(56) References Cited

U.S. PATENT DOCUMENTS

| | | | |
|---|---|---|---|
| 3,906,248 A | * | 9/1975 | Vieira et al. ................. 327/398 |
| 3,906,372 A | * | 9/1975 | Schatter et al. ........... 455/173.1 |
| 4,535,257 A | * | 8/1985 | Hareyama ................... 327/100 |
| 5,059,829 A | * | 10/1991 | Flannagan et al. ............. 326/17 |
| 5,329,187 A | * | 7/1994 | Crispie et al. ............... 327/362 |
| 5,721,594 A | * | 2/1998 | Gurley et al. ................ 348/705 |

* cited by examiner

Primary Examiner—Xuan M. Thai
(74) Attorney, Agent, or Firm—Intellectual Property Solutions, P.L.L.C.

(57) ABSTRACT

A low power high-speed bus receiver which receives a pair of differential signals to obtain the corresponding logic value is provided. The bus receiver includes a differential amplifier, a pair of input switches and a pair of power switches. The differential amplifier has a pair of input terminals and a pair of power terminals. The pair of input switches are respectively connected between the pair of input terminals of the differential amplifier and the pair of differential signals. The pair of input switches are turned on for a predetermined time period to transmit the pair of differential signals to the differential amplifier. The pair of power switches are respectively connected between the pair of power terminals of the differential amplifier and a pair of external power supplies. The pair of power switches are turned on after the pair of input switches are turned on for the predetermined time period to enable the differential amplifier to amplify the difference between the pair of differential signals to obtain the corresponding logic value.

8 Claims, 2 Drawing Sheets

LOW POWER HIGH-SPEED BUS RECEIVER

BACKGROUND OF THE INVENTION

1. Field of the Invention

The present invention relates to a receiver, and in particular to a low power high-speed bus receiver which can receive a pair of differential signals from a single bus or sequentially receive plural pairs of differential signals from plural buses to obtain the corresponding logic value or values.

2. Description of the Invention

In a semiconductor circuit, such as a DRAM, a bus receiver that receives a bus signal from a single bus is usually constructed with an inverter or a buffer. For this bus receiver, as long as the bus signal has a voltage higher or lower than predetermined voltage levels, the bus receiver will generate a logic high or a logic low. Further, the bus receiver not only recovers the bus signal, but also impedance matches with the next-stage circuit, preventing unnecessary distortions as a result of small input impedance.

However, the bus receiver constructed with an inverter or a buffer has a longer delay time and a larger signal swing. Accordingly, analog circuits, such as comparator circuits, are used to develop an analog bus receiver. The analog bus receiver has a shorter delay time. However, the analog bus receiver also needs a bias voltage (usually the average of the highest voltage level and the lowest voltage level), consumes DC current, and has a low noise immunity.

SUMMARY OF THE INVENTION

Therefore, it is an object of the present invention to provide a low power high-speed bus receiver for receiving a pair of differential signals or sequentially receiving plural pairs of differential signals that employs a differential amplifier to make the delay time shorter than that of the conventional bus receiver which employs an inverter or a buffer.

It is another object of the present invention to provide a low power high-speed bus receiver which employs input switches to control the receiving of a pair of differential signals or plural pairs of differential signals and to prevent bus conflicts.

It is another object of the present invention to provide a low power high-speed bus receiver which employs power switches to control the input of external power supplies and to prevent power losses.

It is another object of the present invention to provide a low power high-speed bus receiver which employs a differential amplifier to amplify the difference between a pair of differential signals respectively input to a positive input terminal and a negative input terminal of the differential amplifier, so that it is not necessary to provide a bias voltage and the noise immunity is also increased.

To achieve the above and other objects, the present invention provides a low power high-speed bus receiver which receives a pair of differential signals to obtain the corresponding logic value. The bus receiver includes a differential amplifier, a pair of input switches and a pair of power switches. The differential amplifier has a pair of input terminals and a pair of power terminals. The pair of input switches are respectively connected between the pair of input terminals of the differential amplifier and the pair of differential signals. The pair of input switches are turned on for a predetermined time period to transmit the pair of differential signals to the differential amplifier. The pair of power switches are respectively connected between the pair of power terminals of the differential amplifier and a pair of external power supplies. The pair of power switches are turned on after the pair of input switches are turned on for the predetermined time period to enable the differential amplifier to amplify the difference between the pair of differential signals to obtain the corresponding logic value.

The present invention also provides a low power high-speed bus receiver for sequentially receiving several pairs of differential signals from several buses. The bus receiver includes a differential amplifier, several pair of input switches and a pair of power switches. The differential amplifier has a pair of input terminals and a pair of power terminals. The plural pairs of input switches are respectively connected between the pair of input terminals of the differential amplifier and the plural pairs of differential signals. The plural pairs of input switches are sequentially turned on for a predetermined time period to transmit each of the plural pairs of differential signals to the differential amplifier. The pair of power switches are respectively connected between the pair of power terminals of the differential amplifier and a pair of external power supplies. The pair of power switches are turned on after each of the plural pairs of input switches are turned on for the predetermined time period to enable the differential amplifier to amplify the difference between each of the pairs of differential signals to obtain the corresponding logic values.

In the above mentioned bus receivers, the pair (or the plural pairs) of input switches can be a pair (or plural pairs) of transmission gates, and the pair of power switches can be a pair of transistors.

BRIEF DESCRIPTION OF THE DRAWINGS

The aforementioned objects, features and advantages of this invention will become apparent by referring to the following detailed description of a preferred embodiment with reference to the accompanying drawings, wherein.

DETAILED DESCRIPTION OF THE EMBODIMENT

Figure 1:
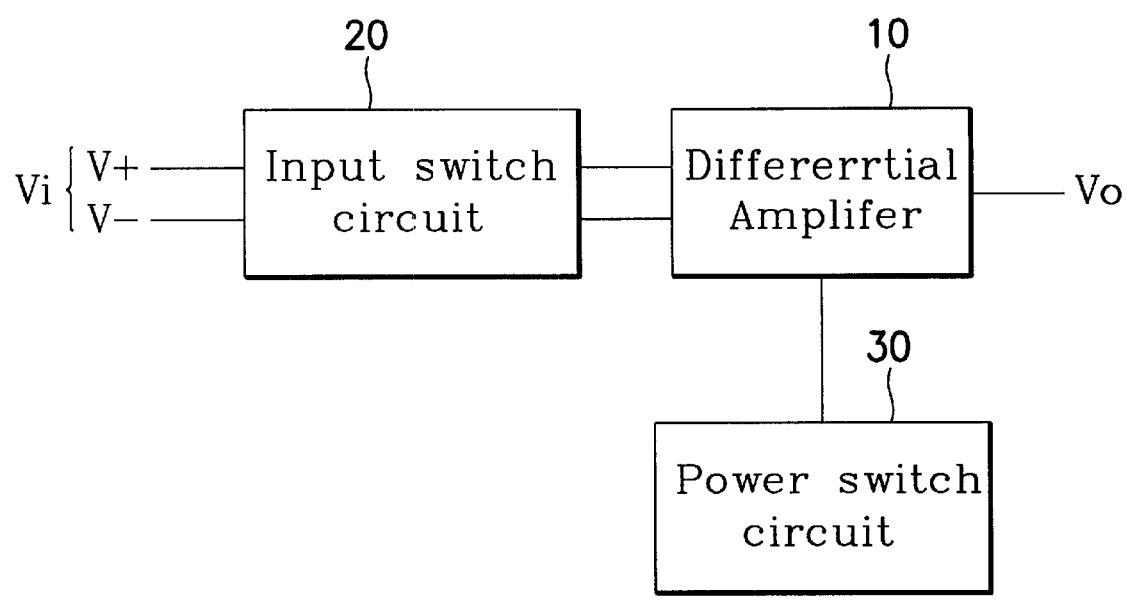
FIG. 1 is a block diagram illustrating a bus receiver according to the present invention.

FIG. 1 is a block diagram illustrating a low power high-speed bus receiver according to the present invention. As shown in FIG. 1, the bus receiver includes a differential amplifier 10, an input switch circuit 20 and a power switch circuit 30. The differential amplifier 10 includes a positive input terminal and a negative input terminal. The input switch circuit 20 is connected between the differential amplifier 10 and a pair of differential signals Vi (including a positive input signal V+ and a negative input signal V−). The power switch circuit 30 is connected between the differential amplifier 10 and external power supplies (not shown in FIG. 1).

When the bus receiver is enabled to receive the pair of differential signals Vi, the input switch circuit 20 is first turned on for a predetermined time period to transmit the positive input signal V+ and the negative input signal V− to the positive input terminal and the negative input terminal of the differential amplifier 10. At this time, the power switch circuit 30 is still turned off, so the differential amplifier 10 is not powered and can not perform any operations. After the input switch circuit 20 is turned on for the predetermined time period, the power switch circuit 30 is then turned on to power the differential amplifier 10, and the differential amplifier 10 will amplify the difference between the positive input terminal (the positive input signal V+) and the negative input terminal (the negative input signal V−) and output the amplified result as the corresponding logic value of the pair of differential signals Vi.

In this embodiment, the predetermined time period must be longer than that needed when the positive input signal V+ and the negative input signal V− intersect and have a certain voltage difference, say several mV, during the state transition of the pair of differential signals Vi. That is, when the positive input signal V+ and the negative input signal V− are respectively transited from a logic H to a logic L and from a logic L to a logic H, the predetermined time period should be longer than that needed when the falling positive input signal V+ intersects with the rising negative input signal V− and becomes lower than the rising negative input signal V− by a certain voltage difference. Here, the certain voltage difference can be as small as what the differential amplifier 10 can differentiate. Similarly, when the positive input signal V+ and the negative input signal V− are respectively transited from a logic L to a logic H and from a logic H to a logic L, the predetermined time period should be longer than that needed when the rising positive input signal V+ intersects with the falling negative input signal V− and becomes higher than the falling negative input signal V− by a certain voltage difference.

Compared with the present invention, the inverter or the buffer of the conventional bus receiver must wait until the bus signal reaches the specified levels, then output the corresponding logic value. Therefore, the conventional bus receiver will have a longer delay time during the state transition of the bus signal.

On the contrary, the bus receiver of the present invention employs the differential amplifier 10 to shorten the delay time. Because the differential amplifier 10 can amplify any small differences, say several mV, between the positive input terminal and the negative input terminal, the corresponding logic value can be quickly obtained as long as a small difference exists between the positive input terminal and the negative it input terminal of the differential amplifier 10. Accordingly, the delay time of the present invention can be shortened, and the needed signal swing for the pair of differential signals Vi can be further decreased to about 200 mV, greatly reducing the loading of the bus and other connected circuits.

Figure 2A:
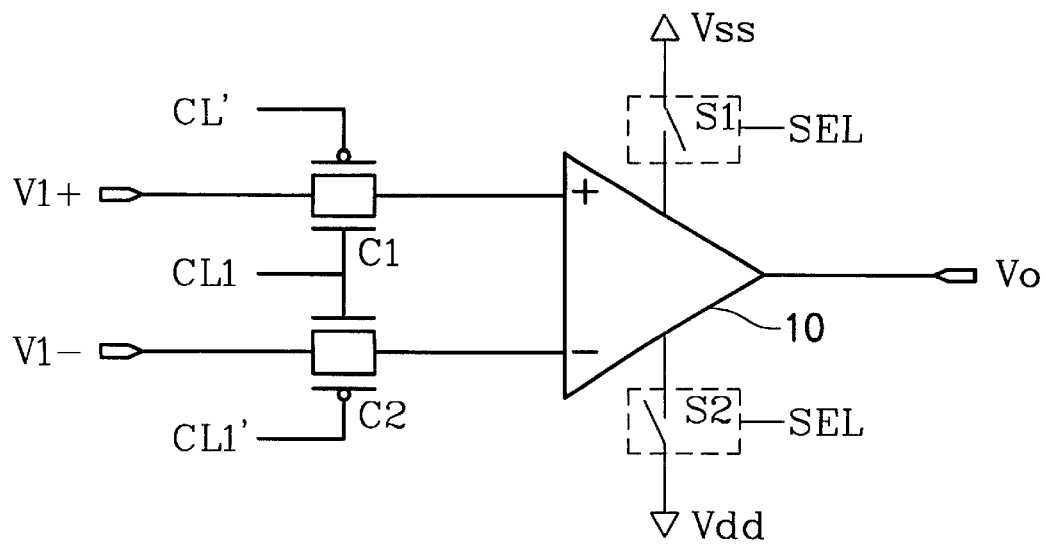
FIG. 2A is a circuit diagram illustrating a bus receiver which receives differential signals from a single bus according to the present invention.
Figure 2B:
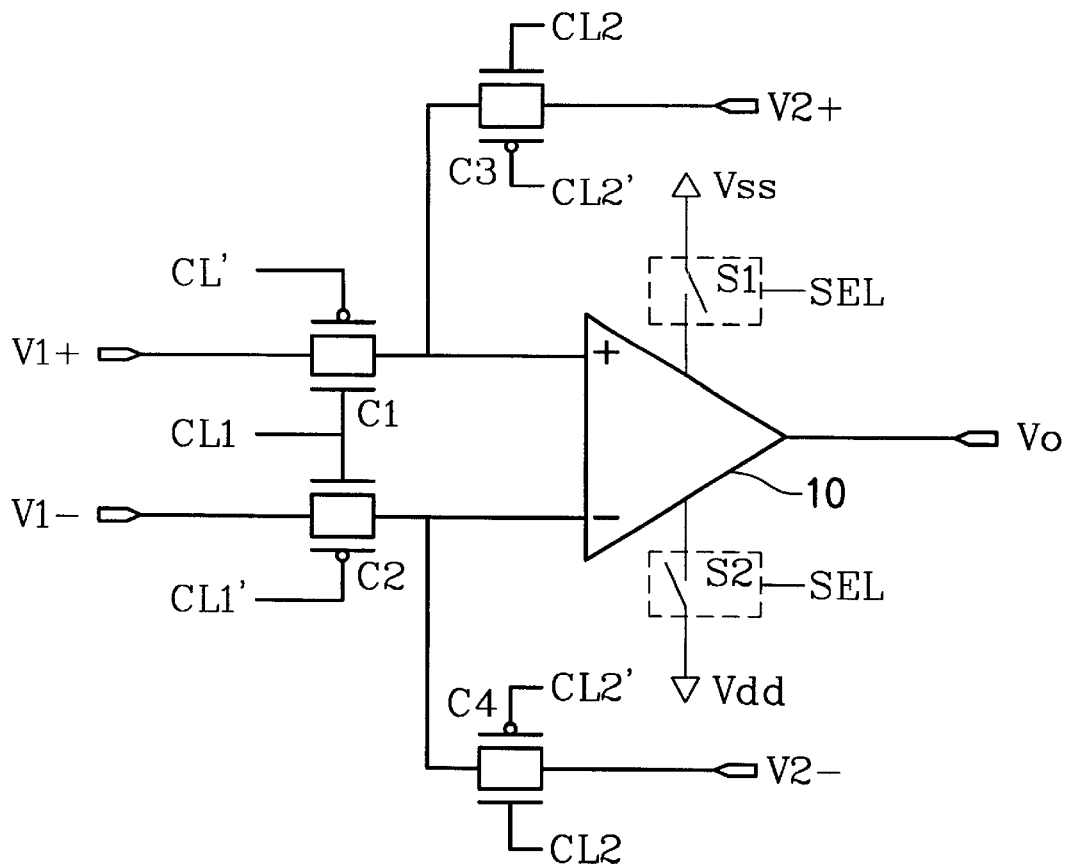
FIG. 2B is a circuit diagram illustrating a bus receiver which sequentially receives differential signals from a plurality of buses according to the present invention.

FIG. 2A is a circuit diagram illustrating a bus receiver which receives differential signals from a single bus according to the present invention, and FIG. 2B is a circuit diagram illustrating a bus receiver which sequentially receives differential signals from a plurality of buses according to the present invention.

In FIG. 2A, the bus receiver includes a differential amplifier 10, a pair of transmission gates C1~C2 and a pair of switches S1~S2. The differential amplifier 10 includes a positive input terminal and a negative input terminal. The pair of transmission gates C1~C2 are provided to transmit the pair of differential signals Vi (including a positive input signal V+ and a negative input signal V−) to the differential amplifier 10. The transmission gate C1 is connected between the positive input signal V+ and the positive input terminal of the differential amplifier 10. The transmission gate C2 is connected between the negative input signal V− and the negative input terminal of the differential amplifier 10. The differential amplifier 10 also includes a positive power terminal and a negative power terminal. The pair of switches S1~S2 are provided to connect external power supplies to the differential amplifier 10. The switch S1 is connected between a positive power supply (Vss in FIG. 2A) and the positive power terminal of the differential amplifier 10. The switch S2 is connected between a negative power supply (Vdd in FIG. 2A) and the negative power terminal of the differential amplifier 10. The differential amplifier 10 amplifies the difference between the positive input terminal (the positive input signal V+) and the negative input terminal (the negative input signal V−), and outputs the amplified result as the corresponding logic value of the pair of differential signals Vi. The pair of transmission gates C1~C2 are respectively controlled by a control signal CL1 and its inverse signal CL1'. The pair of switches S1~S2 are controlled by a control signal SEL.

When the bus receiver wants to receive the pair of differential signals Vi from a single bus, the control signal CL1 and its inverse signal CL1' are first driven to a pulse having a predetermined pulse width, respectively, to turn on the pair of transmission gates C1~C2 and transmit the positive input signal V+ and the negative input signal V− to the positive input terminal and the negative input terminal of the differential amplifier 10. At this time, the pair of switches S1~S2 are still turned off, so the differential amplifier 10 is not powered and can not perform any operations.

After the pair of transmission gates C1~C2 are turned off again, the control signal SEL is then driven to a pulse to turn on the pair of switches S1~S2 and power the differential amplifier 10. Therefore, the differential amplifier 10 can amplify the difference between the positive input terminal (the positive input signal V+) and the negative input terminal (the negative input signal V−), and output the amplified result as the corresponding logic value of the pair of differential signals Vi.

In this example, the control signals CL1 and CL1' of the pair of transmission gates C1~C2 can be indicative signals which inform the receiving of the differential signals. The pair of switches S1~S2 can be constructed with transistors. And the control signal SEL of the pair of switches S1~S2 can be obtained by delaying the indicative signals for the predetermined time period.

In FIG. 2B, the bus receiver includes a differential amplifier 10, two pairs of transmission gates C1~C4 and a pair of switches S1~S2. The differential amplifier 10 includes a positive input terminal and a negative input terminal. The pair of transmission gates C1~C2 are provided to transmit a pair of differential signals V1 (including a positive input signal V1+ and a negative input signal V1−) from a first bus to the differential amplifier 10. The transmission gate C1 is connected between the positive input signal V1+ and the positive input terminal of the differential amplifier 10. The transmission gate C2 is connected between the negative input signal V1− and the negative input terminal of the differential amplifier 10. The pair of transmission gates C3~C4 are provided to transmit a pair of differential signals V2 (including a positive input signal V2+ and a negative input signal V2−) from a second bus to the differential amplifier 10. The transmission gate C3 is connected between the positive input signal V2+ and the positive input terminal of the differential amplifier 10. The transmission gate C4 is connected between the negative input signal V2− and the negative input terminal of the differential amplifier 10. The differential amplifier 10 also includes a positive power terminal and a negative power terminal. The pair of switches S1~S2 are provided to input external power supplies to the differential amplifier 10. The switch S1 is connected between a positive power supply (Vss in FIG. 2B) and the positive power terminal of the differential amplifier 10. The switch S2 is connected between a negative power supply (Vdd in FIG. 2B) and the negative power terminal of the differential amplifier 10. The differential amplifier 10 amplifies the difference between the positive input terminal and the negative input terminal (the difference between the positive input signal V1+ and the negative input signal V1− or the difference between the positive input signal V2+ and the negative input signal V2−), and outputs the amplified results as the corresponding logic values of the pair of differential signals V1 and the pair of differential signals V2. The pair of transmission gates C1~C2 are respectively controlled by a control signal CL1 and its inverse signal CL1'. The pair of transmission gates C3~C4 are respectively controlled by a control signal CL2 and its inverse signal CL2'. The pair of switches S1~S2 are controlled by a control signal SEL.

When the bus receiver wants to sequentially receive the pair of differential signals V1 from the first bus and the pair of differential signals V2 from the second bus, the control signal CL1 and its inverse signal CL1' are first driven to a pulse having a predetermined pulse width, respectively, to turn on the pair of transmission gates C1~C2 and transmit the positive input signal V1+ and the negative input signal V1− from the first bus to the positive input terminal and the negative input terminal of the differential amplifier 10. At this time, the pair of switches S1~S2 are still turned off, so the differential amplifier 10 is not powered and can not perform any operations. After the pair of transmission gates C1~C2 are turned off again, the control signal SEL is driven to a pulse to power the differential amplifier 10, and the differential amplifier 10 can amplify the difference between the positive input terminal (the positive input signal V1+) and the negative input terminal (the negative input signal V1−), and output the amplified result as the corresponding logic value of the pair of differential signals V1.

Thereafter, the control signal CL2 and its inverse signal CL2' are driven to a pulse having the predetermined pulse width, respectively, to transmit the positive input signal V2+ and the negative input signal V2− from the second bus to the positive input terminal and the negative input terminal of the differential amplifier 10. At this time, the pair of switches S1~S2 are again turned off, so the differential amplifier 10 is not powered and can not perform any operations. After the pair of transmission gates C3~C4 are turned off again, the control signal SEL is driven to a pulse again to power the differential amplifier 10. Then the differential amplifier 10 can amplify the difference between the positive input terminal (the positive input signal V2+) and the negative input terminal (the negative input signal V2−), and output the amplified result as the corresponding logic value of the pair of differential signals V2.

In this case, the control signals CL1 and CL1' of the pair of transmission gates C1 and C2 can be indicative signals which inform the receiving of the pair of differential signals V1 from the first bus. The control signals CL2 and CL2' of the pair of transmission gates C3 and C4 can be indicative signals which inform the receiving of the pair of differential signals V2 from the second bus. The pair of switches S1~S2 can be constructed with transistors, and the control signal SEL can be obtained by delaying the indicative signals which inform the receiving of the pair of the pair of differential signals V1 and the pair differential signals V2 for the predetermined time period.

Summing up the above, the low power high-speed bus receiver of the present invention is provided for receiving a pair of differential signals or sequentially receiving plural pairs of differential signals, which employs a differential amplifier to make the delay time shorter than that of the conventional bus receiver which employs an inverter or a buffer.

The low power high-speed bus receiver of the present invention also employs input switches to control the receiving of a pair of differential signals or plural pairs of differential signals, so bus conflicts and power loss can be reduced.

The low power high-speed bus receiver of the present invention also employs a differential amplifier to amplify the difference of a pair of differential signals, so it is not necessary to provide a bias voltage and the noise immunity is also increased.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A low power high-speed bus receiver for receiving a pair of differential signals from a single bus, comprising:
   a differential amplifier having a pair of input terminals and a pair of power terminals;
   a pair of input switches respectively connected between the pair of input terminals of the differential amplifier and the pair of differential signals, the pair of input switches being turned on for a predetermined time period to transmit the pair of differential signals to the differential amplifier; and
   a pair of power switches respectively connected between the pair of power terminals of the differential amplifier and a pair of external power supplies, the pair of power switches being turned on after the pair of input switches are turned on for the predetermined time period to enable the differential amplifier to amplify a difference between the pair of differential signals to obtain corresponding logic value.

2. The low power high-speed bus receiver as claimed in claim 1, wherein the pair of input switches are a pair of transmission gates.

3. The low power high-speed bus receiver as claimed in claim 1, wherein the pair of power switches are a pair of transistors.

4. The low power high-speed bus receiver as claimed in claim 1, wherein the predetermined time period is long enough for the difference between the pair of the differential signals to change to a level significant to the differential amplifier during the transition of the pair of the differential signals.

5. The low power high-speed bus receiver as claimed in claim 4, wherein the level significant to the differential amplifier is as small as several mili-volts.

6. A low power high-speed bus receiver for sequentially receiving a plurality of pairs of differential signals from a plurality of buses, comprising:
   a differential amplifier having a pair of input terminals and a pair of power terminals;
   a plurality of pairs of input switches respectively connected between the pair of input terminals of the differential amplifier and the plurality of pairs of differential signals, the input switches being sequentially turned on for a predetermined time period to transmit the plurality of pairs of differential signals to the differential amplifier; and a pair of power switches respectively connected between the pair of power terminals of the differential amplifier and a pair of external power supplies, the power switches being turned on after the plurality of pairs of input switches are turned on for the predetermined time period to enable the differential amplifier to amplify a difference between each of the pairs of differential signals to obtain corresponding logic values.

7. The low power high-speed bus receiver as claimed in claim 6, wherein the plurality of pairs of input switches are a plurality of pairs of transmission gates.

8. The low power high-speed bus receiver as claimed in claim 6, wherein the pair of power switches are a pair of transistors.

* * * * *